[47.] Chas. Kugler  Impd. Horse Hay Rake.
No. 118,726.   Fig. 1.   Patented Sep. 5, 1871.
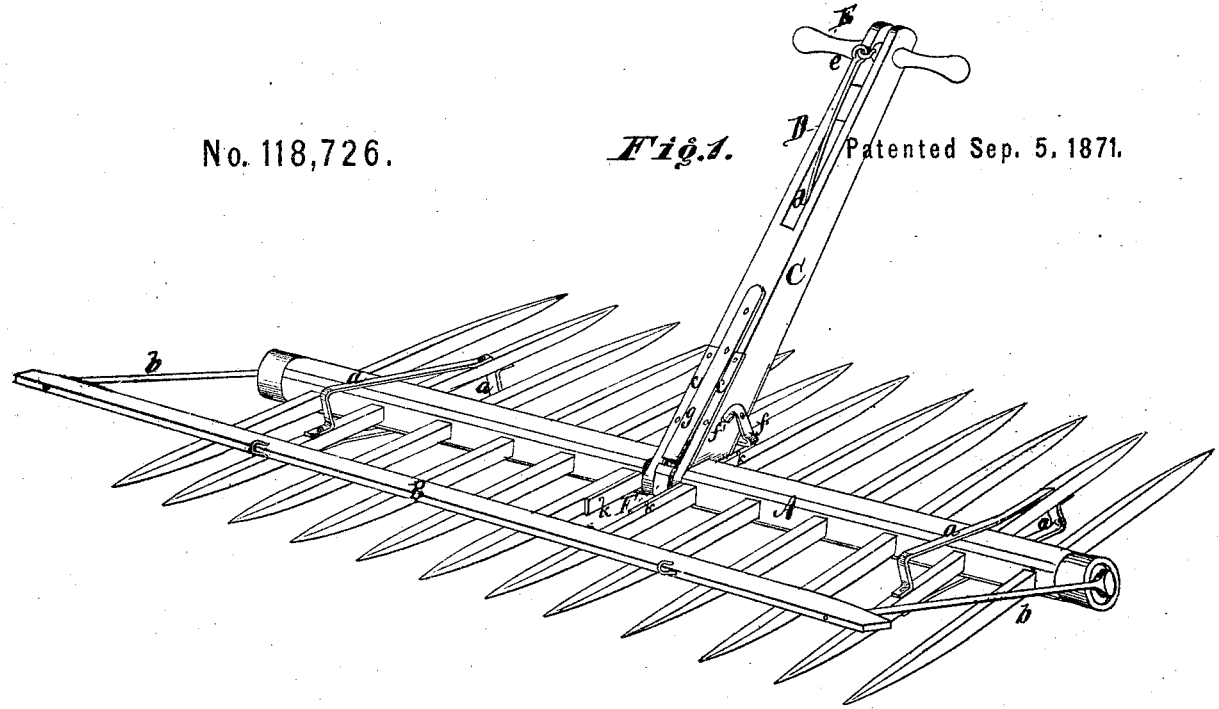
Fig. 2.
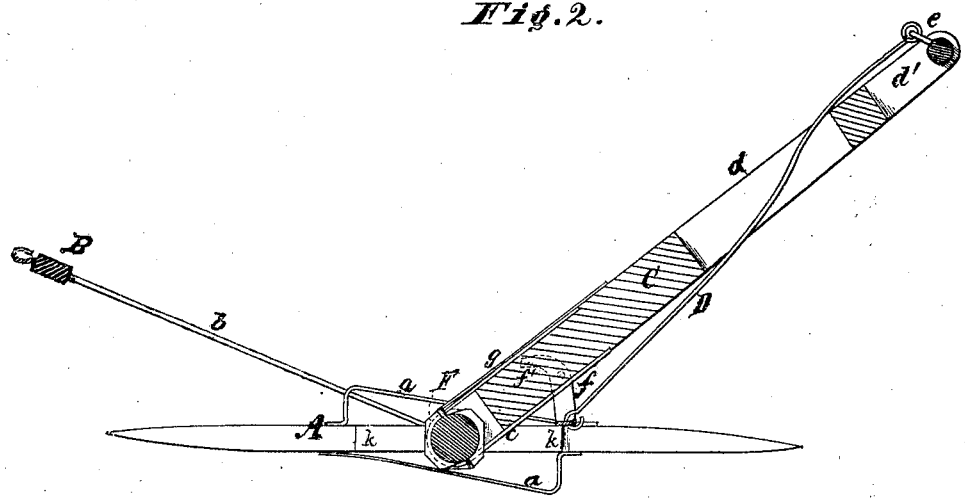
Witnesses.
E. R. Brown
H. Lansing Perrine
Inventor.
Charles Kugler,
by J. C. Theaker
Attorney.

UNITED STATES PATENT OFFICE.

CHARLES KUGLER, OF BARNESVILLE, OHIO.

IMPROVEMENT IN HORSE HAY-RAKES.

Specification forming part of Letters Patent No. 118,726, dated September 5, 1871.

*To all whom it may concern:*

Be it known that I, CHARLES KUGLER, of Barnesville, in the county of Belmont and State of Ohio, have invented a new and useful Improvement in Horse-Rakes; and I do hereby declare that the following is a full, clear, and exact description thereof, sufficient to enable those skilled in the art to which my invention appertains to make and use the same, reference being had to the accompanying drawing making part of this specification, in which—

Figure 1 is a perspective view of my invention, and Fig. 2 is a central section of the same.

My invention relates to that class of horse hay-rakes which revolves on the ground; and it consists of a trip for holding the rake when in operation, and for allowing it to be revolved when necessary, the said trip being set as hereinafter described.

In the drawing, A represents a wooden rake of ordinary construction, provided with guards $a\ a$, arranged as inclines on both sides of the rake, in the usual manner. B is the drag-bar, secured to the rake-head by metal or other rods, $b\ b$, pivoted to the ends of the rake-head. C is the rake-operating and guiding-handle, secured to the rake by metallic strap-joints $c\ c$ passing around the rake-head, as usual. The handle C is slotted at $d\ d'$, and a rod, D, secured to an eye, $e$, on the bar E, passes through the slot $d$ underneath the handle, and is attached to a self-setting trip, $f$, which is hinged to the handle and rests on stops $k$ fastened to the teeth, whereby the handle is held in the position shown in Fig. 2.

This trip is operated, in order to release the handle, by turning the bar E, which draws the rod D and thus frees the trip from the stops $k$ on the teeth. It is rendered self-setting by means of its curved flattened ends $f'$, which, when the trip is disengaged from the stops $k$ so as to allow the rake to revolve, strike against the ends of the stops $k$, and the trip is set ready to fall back to its place on the stops on the opposite side of the rake-head and remains there, holding the rake until drawn away by the operator.

What I claim as new, and desire to secure by Letters Patent, is—

The combination, in a revolving horse-rake, of the trip $f$ and stops $k$, constructed and operating substantially as described, for the purpose set forth.

C. KUGLER.

Witnesses:
R. C. GRAVES,
W. KERSTINE.